United States Patent Office 3,364,284
Patented Jan. 16, 1968

3,364,284
EXTRUSION OF HIGH MOLECULAR WEIGHT
ETHYLENE POLYMER USING POLYSTYRENE
AS A PROCESSING AID
Lee O. Edmonds, William M. Nelson, and James T.
Edmonds, Jr., Bartlesville, Okla., assignors to Phillips
Petroleum Company, a corporation of Delaware
No Drawing. Filed Apr. 6, 1962, Ser. No. 185,505
8 Claims. (Cl. 260—897)

This invention relates to an improved method for extruding high molecular weight ethylene polymer. In another aspect it relates to pipe made from ethylene polymer of high molecular weight.

Ethylene polymers of relatively high density are finding more and more usage in the plastics art. One type of these polymers having extremely high molecular weight has been found to be exceptionally valuable, because of their high tensile strengths, in the manufacture of articles such as pipe, fiber and the like. Such high molecular weight ethylene polymers can be prepared, for example, by conducting the polymerization in the presence of a chromium oxide catalyst at temperatures below that at which the polymer dissolves in the reaction diluent so that the polymer is formed in suspension. One very serious problem encountered in the use of these high molecular weight polymers in the manufacture of the articles named is that they are very difficult to extrude. Because of their melt flow properties extrusion rates are retarded and the extrudate is frequently rough.

Corresponding problems in processibility are not encountered with the lower molecular weight, high density ethylene polymers such as are prepared in solution with the chromium oxide catalyst. One approach to the processing problem with the suspension polymer has been to reduce the molecular weight of the polymer by limited pyrolysis. While this solves the processing problem, the reduction of the molecular weight also results in loss of certain advantages which are particularly valuable in the manufacture of pipe. Possible steps which can be taken to improve the extrudability of such polymers while retaining their high molecular weight have not been apparent because the problem does not exist with the more common ethylene polymers of lower molecular weight.

We have now discovered that smooth extrudates can be obtained with significantly improved rates from the high molecular weight, high density polymers of ethylene by combining therewith a small amount of polystyrene, and thereafter extruding the resulting blend. The blend that is prepared for extrusion should contain between 1 and 15 weight percent polystyrene and preferably from 1 to 10 weight percent based on the total weight of the ethylene polymer plus the polystyrene. By the method of this invention extrusion rates are increased, surface smoothness and gloss are significantly improved while the other physical properties are similar to those of the parent high molecular weight ethylene polymer. Pipe which is prepared in this manner is definitely superior to pipe prepared from the lower molecular weight ethylene polymers of comparable processibility. It has been generally known in regard to the low density and/or low molecular weight polyethylenes that polystyrene is incompatible with these polymers. It was quite unexpected, therefore, that improved extrudates could be formed from blends of polystyrene and high density, high molecular weight ethylene polymer.

It is an object of our invention to provide an improved method for extruding plastic pipe from high molecular weight ethylene polymer. Another object of our invention is to provide an improved method of extruding ethylene polymer having a relatively high molecular weight. Another object is to provide extruded pipe made from high molecular weight ethylene polymer. Other objects and advantages, and features of our invention will be apparent to those skilled in the art from the following discussion.

The ethylene polymers which are used in our invention have exceptionally high molecular weight as indicated by a high inherent viscosity and/or low melt index. In general, these polymers have an inherent viscosity in the range of 3 to 15 and preferably between 3 and 10. The inherent viscosity is determined in the conventional manner using an Oswald-Fenske viscosimeter with the polymer in solution in tetralin at 130° C. These polymers can also be characterized by a high load melt index in the range between 0.6 and 10. This property is determined by ASTM D-1238-57T, condition F., using a temperature 190° C. and a weight of 21,600 grams. The ethylene polymers have a density in the range of 0.930 to 0.990 gram per cubic centimeter at 25° C. and preferably this density is between 0.940 and 0.970. The density of the polymer is determined on a specimen prepared by compression molding the polymer at 340° F. until completely molten followed by cooling to 200° F. at a rate of about 10° F. per minute and then cooling further to 150° F. at a rate not exceeding 20° F. per minute. The specimen is then cooled to room temperature. Any standard method for determining the density of a solid can then be used. The polymers can be a homopolymer of ethylene or a copolymer of ethylene with a small amount of 1-olefin having 3 to 6 carbon atoms per molecule such as propylene, 1-butene, 1-pentene, 4-methyl-1-pentene and the like. Normally the amount of high 1-olefin combined in the polymer is less than 10 weight percent and preferably it is less than 5 weight percent. Any method known in the art can be used to prepare ethylene polymers for use in the blends of this invention provided the polymers have the properties specified above. Blends of ethylene polymers such as blends of polyethylene and/or ethylene copolymers can also be used. It should be understood that the final blend can also contain conventional additives such as antioxidants, antiozonants, U.V. inhibitors, dyes, pigments (such as carbon black), and the like.

The polystyrene which is used in the blends is known as general-purpose polystyrene and is a commercially available product. The ethylene polymer and the polystyrene can be premixed in a Banbury mixer or on a roll mill or the polymers can be dry blended in the feed to the extrusion operation. The polymeric blends are extruded at temperatures in the range of about 300 to 650° F. depending upon the product being made. In the manufacture of pipe, temperatures in the range of 350 to 550° F. are generally used while somewhat higher temperatures are used for extrusion coating. The pressures at the die in the extruder are normally about 1000 to 6000 p.s.i.g. The speed of extrusion is a factor in determining the desirable temperature and pressure. At any given temperature and pressure in the extrusion operation considerably higher extrusion rates can be obtained with the blends of this invention than with the high molecular weight ethylene polymer alone. The extrudate is dense, solid polymeric material having physical properties similar to those of the ethylene polymer.

To illustrate further the advantages of our invention the following examples are presented. The conditions and proportions should be construed as typical only and not to limit our invention unduly.

*Example I*

A series of blends of high molecular weight ethylene polymer with polystyrene was prepared for testing in fiber extrusion operations. Extrusion was through a die or capillary having a diameter of 0.01925 inch and a length of 0.176 inch. Molten polymer was extruded through the die by nitrogen pressure. For fiber extrusion and determination of flow rate, the temperature was maintained at 500° F. and the pressure at 1000 p.s.i. Data from these tests are shown in Table I.

TABLE I

| Run No. | Ethylene Polymer [a] (weight percent) | Polystyrene [b] (weight percent) | Flow (g./min.) | Fiber |
|---|---|---|---|---|
| 1 | 100 | | 0.007 | Rough. |
| 2 | 99.5 | 0.5 | 0.0122 | Do. |
| 3 | 98.0 | 2.0 | 0.020 | Smooth. |
| 4 | 90.0 | 10.0 | 0.128 | Do. |

[a] Ethylene-1-butene copolymer prepared in a slurry system in the presence of a chromium oxide catalyst. Density 0.942, melt index (high load) about 1.6 and inherent viscosity about 4.1.
[b] General purpose polystyrene marketed by Koppers Company.

These data show that fibers from a high molecular weight polymer of ethylene in which are incorporated more than 0.5 phr. of polystyrene are smooth, while the controls are rough.

*Example II*

A 90/10 blend of high molecular weight ethylene-1-butene copolymer with polystyrene was prepared by Banbury mixing. The copolymer had a density of about 0.940 and a high load melt index of about 1.5. From this blend, stabilized with 0.1 percent Santonox, test specimens of 1-inch pipe were extruded using a 1½-inch extruder fitted with an offset die. These test specimens were subjected to burst tests by being filled with water, brought to equilibrium temperature in a constant temperature bath and subjected to pressure from a water accumulator under nitrogen pressure. The time to failure was recorded as burst strength. For these tests hoop stress was calculated using the formula $S=PD/2t$ in which S is hoop stress, P is internal pressure in p.s.i., D is average outside diameter, and $t$ is the minimum wall thickness. Data on these tests are tabulated below.

TABLE II.—BURST TESTS OF EXTRUDED PIPE

| Temp. (° F.) | Hoop Stress (p.s.i.) | Time to Failure |
|---|---|---|
| 75 | 3,287 | 4 min. |
| 75 | 2,800 | 17 min. |
| 75 | 2,500 | 1 hour. |
| 75 | 2,300 | 2.5 hours. |
| 75 | 2,000 | 120 hours. |
| 75 | 1,500 | >864 hours.[a] |
| 75 | 1,000 | >888 hours.[a] |
| 150 | 1,530 | 5 min. |
| 150 | 1,450 | 11 min. |
| 150 | 1,200 | 18 hours. |
| 150 | 1,000 | >888 hours.[a] |
| 150 | 700 | >912 hours.[a] |
| 150 | 300 | >912 hours.[a] |
| 190 | 800 | 17 hours. |
| 190 | 600 | 575 hours. |

[a] Still running.

These data show that the polymer blends provide satisfactory service performance at temperatures in the ranges tested under conditions considerably more drastic than could be encountered in most practical applications.

The pipe used in these tests was smooth and glossy in appearance. Extrusion time was about 25 percent faster than could be realized when using high molecular weight polymer alone (without polystyrene added).

*Example III*

In order to demonstrate the comparative effectiveness of the blends of the invention and other polymers of comparable processability as pipe materials, a series of tests was made using the techniques described in Example II in which pipe fabricated from the blend was compared with pipe made from a solution copolymer of ethylene with 1-butene under comparable conditions. Data on these tests are shown in Table II.

TABLE III

| Temp. (° F.) | Hoop Stress (p.s.i.) | Time to Failure (hr.) | |
|---|---|---|---|
| | | Blend [a] | Solution Polymer [b] |
| 75 | 2,500 | 1 | 1 |
| 75 | 2,000 | 120 | 50 |
| 150 | 1,450 | 18 | 10 |
| 150 | 1,000 | 888 | 200 |
| 190 | 800 | 17 | 12 |
| 190 | 600 | 575 | 90 |

[a] 90/10 blend of ethylene-1-butene copolymer; M.I. (high load), 0.98; density, 0.942 with polystyrene; density of blend, 0.9493.
[b] Ethylene-1-butene copolymer; density 0.950.

These data show that pipe fabricated from the blend of this invention is better than pipe from a solution polymer of ethylene having comparable density and processability as measured in terms of pipe burst data under similar conditions.

As will be apparent to those skilled in the art, various modifications can be made in our invention without departing from the spirit or scope thereof.

We claim:

1. A method of making a smooth elongated structure of dense polymeric material which comprises mixing together 85 to 99 parts by weight of an ethylene polymer selected from the group consisting of polyethylene and copolymers of ethylene with 1-olefins having 3 to 6 carbon atoms and said polymer having a density in the range of 0.930 to 0.990 gram per cubic centimeter at 25° C. and a high load melt index of 0.6 to 10 and 1 to 15 parts by weight polystyrene, and extruding the resulting mixture in the shape of said structure in a dense, solid form.

2. The method of claim 1 wherein said ethylene polymer is a copolymer of ethylene and butene-1.

3. A method of making a smooth, elongated structure of dense polymeric material which comprises mixing together 90 to 99 parts by weight of ethylene polymer selected from the group consisting of polyethylene and copolymers of ethylene with 1-olefins having 3 to 6 carbon atoms and said polymer having a density in the range of 0.930 to 0.990 gram per cubic centimeter at 25° C. and a high load melt index in the range of 0.6 to 10 with 1 to 10 parts by weight of polystyrene to form a polymeric blend consisting essentially of said ethylene polymer and polystyrene, and extruding said blend in the shape of said structure in a dense, solid form.

4. The method of claim 3 wherein said structure in a dense, solid form is fiber.

5. The method of claim 3 wherein said structure is pipe.

6. Plastic pipe having a solid, dense wall formed by extrusion of a blend of 85 to 99 parts by weight of ethylene polymer selected from the group consisting of polyethylene and copolymers of ethylene with 1-olefins having 3 to 6 carbon atoms and said polymer having a density of about 0.930 to 0.990 gram per cubic centimeter at 25° C. and a high load melt index of about 0.6 to 10 and 1 to 15 parts by weight of polystyrene.

7. Plastic pipe having a solid, dense wall formed by extruding a polymeric blend consisting essentially of 90 to 99 weight percent ethylene polymer selected from the group consisting of polyethylene and copolymers of ethylene with 1-olefins having 3 to 6 carbon atoms and said polymer having a density in the range of 0.940 to 0.970 gram per cubic centimeter at 25° C., an inherent viscosity in the range of 3.0 and 10.0 and a high load melt index in the range of 0.6 to 10 and 1 to 10 weight percent polystyrene.

8. The article of claim 7 wherein said ethylene polymer is a copolymer of ethylene and butene-1 having a density of about 0.94, an inherent viscosity of about 4 and a high load melt index of about 1.

References Cited

UNITED STATES PATENTS

| | | | |
|---|---|---|---|
| 2,655,492 | 10/1953 | Young et al. | 260—897 |
| 2,928,756 | 3/1960 | Campbell | 260—897 |
| 2,956,035 | 10/1960 | Mock | 260—897 |
| 2,983,704 | 5/1961 | Roedel | 260—897 |
| 3,065,190 | 11/1962 | Chisholm et al. | 260—897 |
| 3,252,934 | 5/1966 | Jankens | 260—897 |
| 3,014,887 | 12/1961 | Haward | 260—897 |

GEORGE F. LESMES, *Primary Examiner.*

DONALD E. CZAJA, L. J. BERCOVITZ, MURRAY TILLMAN, *Examiners.*

J. A. KOLASCH, T. G. FIELD, *Assistant Examiners.*

UNITED STATES PATENT OFFICE
CERTIFICATE OF CORRECTION

Patent No. 3,364,284　　　　　　　　　　　　　　January 16, 1968

Lee O. Edmonds et al.

It is hereby certified that error appears in the above numbered patent requiring correction and that the said Letters Patent should read as corrected below.

Column 4, lines 52 and 53, strike out "in a dense, solid form".

Signed and sealed this 29th day of April 1969.

(SEAL)
Attest:

Edward M. Fletcher, Jr.
Attesting Officer

EDWARD J. BRENNER
Commissioner of Patents